United States Patent
Tallone

(10) Patent No.: US 6,647,179 B2
(45) Date of Patent: Nov. 11, 2003

(54) PROCESS AND DEVICE FOR MAKING GRATINGS IN OPTICAL FIBRES

(75) Inventor: Luigi Tallone, Paesana (IT)

(73) Assignee: Agilent Technologies, Inc., Palo Alto, CA (US)

(*) Notice: Subject to any disclaimer, the term of this patent is extended or adjusted under 35 U.S.C. 154(b) by 0 days.

(21) Appl. No.: 09/733,962

(22) Filed: Dec. 12, 2000

(65) Prior Publication Data

US 2001/0016098 A1 Aug. 23, 2001

(30) Foreign Application Priority Data

Dec. 21, 1999 (IT) .................... TO99A1125

(51) Int. Cl.[7] ............................... G02B 6/34
(52) U.S. Cl. ........................ 385/37; 385/24; 65/385; 65/378
(58) Field of Search .................. 385/37, 24; 65/385, 65/378

(56) References Cited

U.S. PATENT DOCUMENTS

| | | | |
|---|---|---|---|
| 3,809,455 A | | 5/1974 | Pekau |
| 5,650,135 A | | 7/1997 | Contag et al. |
| 5,912,999 A | * | 6/1999 | Brennan et al. ............... 359/15 |
| 6,020,121 A | | 2/2000 | Bao et al. |
| 6,217,847 B1 | | 4/2001 | Contag et al. |
| 6,269,208 B1 | * | 7/2001 | Bhatia et al. ............... 359/559 |

FOREIGN PATENT DOCUMENTS

| | | |
|---|---|---|
| EP | 0672922 A2 | 2/1995 |
| WO | WO 96/40979 | 12/1996 |
| WO | WO 97/11690 A2 A3 | 4/1997 |
| WO | WO 97/18841 | 5/1997 |
| WO | WO 97/40381 | 10/1997 |
| WO | PCT/AU98/00086 | 2/1998 |
| WO | WO 98/28971 | 7/1998 |
| WO | WO 98/30715 | 7/1998 |
| WO | WO 00/08726 | 2/2000 |
| WO | WO 00/36106 | 6/2000 |
| WO | WO 00/54581 | 9/2000 |
| WO | WO 01/18195 | 3/2001 |
| WO | WO 01/18225 | 3/2001 |
| WO | WO 01/37195 | 5/2001 |

OTHER PUBLICATIONS

Aiello et al., "Supression of Retinal Neovascularization lin Vivo by Inhibition of Vascular Endothelial Growth Factor (VEGF) Using Soluble VEGF–Receptor Chimeric Proteins," *Proc. Natl. Acad. Sci. U.S.A.* 92:10457–10461 (1995).

Asahara et al., "Bone Marrow Origin of Endothelial Progenitor Cells Responsible for Postnatal Vasculogenesis in Physiological and Pathological Neovascularization," *Circ. Res.* 85:221–228 (1999).

Bais et al., "G–Protein–Coupled Receptor of Kaposi's Sarcoma–Associated Herpes Virus is a Viral Oncogene and Anglogenesis Activator," *Nature* 391:86–89 (1998).

(List continued on next page.)

*Primary Examiner*—Robert H. Kim
*Assistant Examiner*—George Y. Wang

(57) ABSTRACT

During the process of writing a grating, the fiber is placed in a support which has a surface cut-out such as a V-shaped groove. The side walls of this groove form an angle ($\alpha$) of 60° with respect to the direction of propagation of the radiation arriving from the source. The aforesaid surfaces have characteristics of high reflectivity with respect to the aforesaid radiation. Consequently, during the writing process, the core of the fiber is subjected to the action of a plurality of radiation fronts converging on the core. The first radiation front corresponds to the radiation arriving from the source and two other radiation fronts are obtained from this radiation by the effect of the reflection from the walls of the surface cut-out of the support. The preferred application is to the making of long-period gratings.

19 Claims, 2 Drawing Sheets

OTHER PUBLICATIONS

Benjamin et al., "Conditional Switching of Vascular Endothelial Growth Factor (VEGF) Expression in Tumors: Induction of Endothelial Cell Shedding and Regression of Hemangioblastoma–Like Vessels by VEGF Withdrawl," *Proc. Natl. Acad. Sci. U.S.A.* 94:876–8766 (1997).

Berse, B., "Vascular Permeability Factor (Vascular Endothelial Growth Factor) Gene is Expressed Differentially in Normal Tissues, Macrophases, and Tumors," *Molecular Biology of the Cell* 3:211–220 (1992).

Contag et al., "Visualizing Gene Expression Living Mammals Using a Bioluminescent Reporter," *Photochemistry and Photobiology* 66(4):523–531 (1997).

Desalvo et al., "Purification and Characterization of Naturally Occurring Vascular Endothelial Growth Factor–Placenta Growth Factor Heterodimer," *The Journal of Biological Chemistry* 270 (13):7717–7723 (1995).

Dumont, et al., "Dominant–Negative and Targeted Null Mutations in the Endothelial Receptor Tyrosine Kinase, *Tek*, Reveal a Critical Role in Vasculogenesis of the Embryo," *Genes & Development* 8:1897–1909 (1994).

Dvorak et al., "Distribution of Vascular Permeability Factor (Vascular Endothelial Growth Factor) in Tumors: Concentration in Tumor Blood Vessels," *J. Exp. Med.* 174:1275–1278 (1991).

Ferrara et al., "The Biology of Vascular Endothelial Growht Factor," *Endocr. Rev.* 18(1):4–25 (1997).

Ferrara et al., "Heterozygous Embryonic Lethality Inducted by Targeted Inactivation of the VEGF Gene," *Nature* 380:439–442 (1996).

Fong et al., "SU5416 Is a Potent and Selective Inhibitor of the Vascular Endothelial Growth Factor Receptor (Flk–1/KDR) That Inhibits Tyrosine Kinase Catalysis, Tumor Vascularization, and Growth of Multiple Tumor Types," *Cancer Research* 59:99–106 (1999).

Forsythe et al., "Activation of Vascular Endothelial Growth Factor Gene Transcription by Hypoxia–Inducible Factor 1," *Molecular and Cellular Biology* 16(9):4604–4613 (1996).

Fukumura et al., "Tumor Induction of VEGF Promoter Activity in Stromal Cells," *Cell* 94:715–725 (1998).

Hanahan, D., "Signaling Vascular Morphogenesis and Maintenance," *Science* 277:48–50 (1997).

Ikeda et al., "Hypoxia–Induced Transcriptional Activation and Increased mRNA Stability of Vascular Endothelial Growth Factor in C6 Glioma Cells," *The Journal of Biological Chemistry* 270(34):19761–19765 (1995).

Jain, R.K., "Endothelial Cell Death, Augiogenesis, and Microvascular Function After Casteration in an Andgrogen--Dependent Tumor: Role of Vascular Endothelial Groth Factor," *Proc. Natl. Acad. Sci. U.S.A.* 95:10820–10825 (1998).

Jeltsch et al., "Hyperplasia of Lymphatic Vessels in VEGF–C Transgenic Mice," *Science* 276:1423–1425 (1997).

Kaipainen, et al., "Enhanced Expression of the Tie Receptor Tyrosine Kinase Messenger RNA in the Vascular Endothelium of Metastatic Melanomas," *Cancer Research* 54:6571–6577 (1994).

Kappel et al., "Identification of Vascular Endothelial Growth Factor (VEGF) Receptor–2 (*FLK–1*) Promother/Enhancer Sequences Sufficient for Angioblast and Endothelial Cell--Specific Transcription in Transgenic Mice," *Blood* 83(12):4284–4292 (1999).

Kim et al., "Inhibition of Vascular Endothelial Growth Factor–Induced Angiogenesis Supresses Tumour Growth In Vivo,", *Nature* 362:841–844 (1993).

Kitsukawa et al., "Overexpression of Membrane Protein, Neuropilin, in Chimeric Mice Causes Anomalies in the Cardiovascular System, Nervous System and Limbs," *Development* 121:4309–4318 (1995).

Larcher et al., "VEGF/VPF Overexpression in Skin of Transgenic Mice Induces Angiogenesis, Vascular Hyperpermeability and Accelerated Tumor Development," *Oncogene* 17:303–311 (1998).

Millauer, B., "High Affinity VEGF Binding and Developmental Expression Suggest Flk–1 as a Major Regulator of Vasculogenesis and Angiogenes," *Cell* 72:835–846 (1993).

Millauer, B., "Glioblastoma Growth Inhibited In Vivo by a Dominant–Negative Flk–1 Mutant," *Nature* 367:576–579 (1994).

Millauer, B., "Dominant–Negative Inhibition of Flk–1 Suppresses the Growth of Many Tumor Types In Vivo," *Cancer Res.* 56:1615–1620 (1996).

Mukhopadhyay et al., "Wild–Type p53 and v–Src Exert Opposing Influences on Human Vascular Endothelial Growth Factor Gene Expression," *Cancer Res.* 15:6161–6165 (1995).

Mukhopadhyay et al., "Hypoxic Induction of Human Vascular Endothelial Growth Factor Expression Through c–Src Activation," *Nature* 375:577–581 (1995).

Oh et al., "VEGF and VEGF–C: Specific Induction of Angiogenesis and Lyphangiogenesis in the Differentiated Avian Chorioallantoic Membrane," *Developmental Biology* 188:96–109 (1997).

Okamoto et al., "Transgenic Mice With Increased Expression of Vascular Endothelial Growth Factor in the Retinal," *American Journal Pathology* 151:281–291 (1997).

Olofason et al., "Vascular Endothelial Growth Factor B, a Novel Growth Factor for Endothelial Cells,", *Proc. Natl. Acad. Sci. U.S.A.* 93:2576–2581 (1996).

Patterson et al., "Cloning and Functional Analysis of the Promoter for KDR/flk–1, a Receptor for Vascular Endothelial Growth Factor," *The Journal of Biological Chemistry* 270(39):23111–23118 (1995).

Plate et al., "Vascular Endothelial Growth Factor is a Potential Tumour Angiogenesis Factor in Human Gliomas In Vivo," *Nature* 359:845–848 (1992).

Plate et al., "Up–Regulation of Vascular Endothelial Growth Factor and Its Cognate Receptors in a Rat Glioma Model of Tumor Angiogenesis," *Cancer Research* 53:5822–5827 (1993).

Puri et al., "The Receptor Tyrosine Kinase TIE is Required for Integrity and Survival of Vascular Endothelial Cells," *EMBO Journal* 14:5884–5891 (1995).

Röbicke et al., "Characterization of the Endothelium–Specific Murine Vascular Endothelial Growth Receptor–2 (Flk–1) Promoter," *Circulation Research* 79(2):277–285 (1996).

Shalaby et al., "Failure of Blood–Island Formation and Vasculogenesis in Flk–1–Deficient Mice," *Nature* 376:62–65 (1995).

Sheweiki et al., "Vascular Endothelial Growth Factor Induced by Hypoxia may Mediate Hypoxia–Initiated Angiogenesis," *Nature* 359:843–845 (1992).

Sheweiki et al., "Induction of Vascular Endothelial Growth Factor Expression by Hypoxia and by Glucose Deficiency in Multicell Spheroids: Implications for Tumor Angiogenesis," *Proc. Natl. Acad. Sci. U.S.A.* 92:768–772 (1995).

Siemeister et al., "An Antagonistic Vascular Endothelial Growth Factor (VEGF) Variant Inhibits VEGF–Stimulated Receptor Autophosphorylation and Proliferation of Human Endothelial Cells," *Proc. Natl. Acad. Sci. U.S.A.* 95:4625–4629 (1998).

Soker et al., "Neuropilin–1 is Expressed by Endothelial and Tumor Cells as an Isoform–Specific Receptor for Vascular Endothelial Growth Factor," *Cell* 92:735–745 (1998).

Soker et al., "Characterization of Novel Vascular Endothelial Growth Factor (VEGF) Receptors on Tumor Cells that Bind VEGF$_{165}$ Via Its Exon 7–Encoded Domain," *Journal of Biological Chemistry* 271:5761–5767 (1996).

Soker et al., "Inhibition of Vascular Endothelial Growth Factor (VEGF)–Induced Endothelial Cell Proliferation by a Peptide Corresponding to the Exon 7–Encoded Domain of VEGF$_{165}$," *Journal of Biological Chemistry* 272(50):31582–31588 (1997).

Stratman, A., "Cell Type–Specific Expression of Angiopoietin–1 and Angiopoietin–2 Suggests a Role in Glioblastoma Angiogenesis," *American Journal of Pathology* 153(5):1459–1466 (1998).

Suri et al., "Requisite Role of Angiopoietin–1, a Ligand for the TIE2 Receptor, During Embryonic Angiogenesis," *Cell* 87:1171–1180 (1996).

Takahsahi et al., "Markedly Increased Amounts of Messenger RNAs for Vascular Endothelial Growth Factor and Placenta Growth Factor in Renal Cell Carcinoma Associated with Angiogenesis," *Cancer Res.* 54:4233–4237 (1994).

Terman et al, "Identification of a New Endothelial Cell Growth Factor Recptor Tyrosine Kinase," *Oncogene Sept.* 6(9):1677–1683 (1991).

Tischer et al., "The Human Gene For Vascular Endothelial Growth Factor," *Journal of Biological Chemistry*: 266 (18):11947–11954 (1991).

Wallenberger, J., "Different Signal Transduction Properties of KDR and Flt1, Two Receptors for Vascular Endothelial Growth Factor," *Journal of Biological Chemistry* 269:26988–26995 (1995).

Yoshiji et al., "Vascular Endothelial Growth Factor is Essential for Initial but not Continued in Vivo Growth of Human Breast Carcinoma Cells," *Cancer Research* 57:3924–3928 (1997).

Yuan et al., "Time–Dependent Vascular Regression and Permeability Changes in Established Human Tumor Xenografts Induced by an Anti–Vascular Endothelial Growth Factor/Vascular Permeability Factor Antibody," *Prov. Natl. Acad. Sci. U.S.A.* 93:14765–14770 (1996).

"Long–Period Fiber Gratings as Band–Rejection Filters," A Vengsarkar et al., *Journal of Lightwave Technology*, vol. 14, No. 1, pp. 58–65, Jan. 1996.

Optical Fiber Communication '96—Temperature–Insensitive Long–Period Fiber Grating Temperature–Insensitive and Strain–Insensitive Long–Period Grating Sensors for Smart Structure—Optical Engineering, vol. 36 No. 7, Jul. 1997.

* cited by examiner

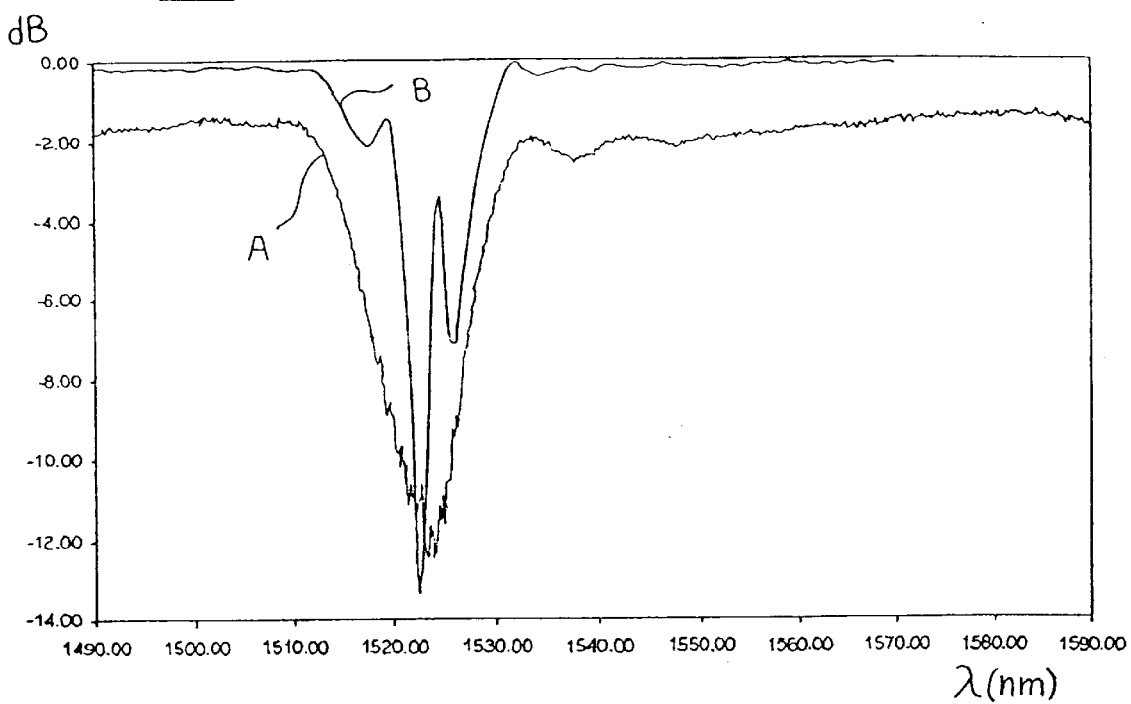
Fig_1 KNOWN ART
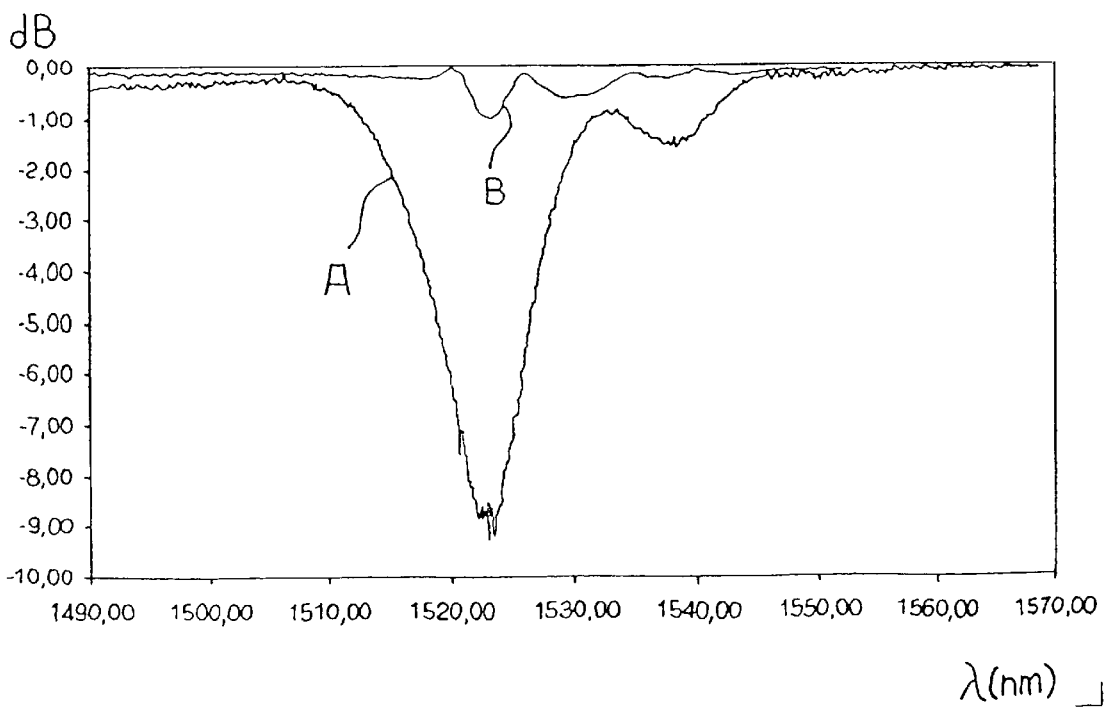
Fig_3

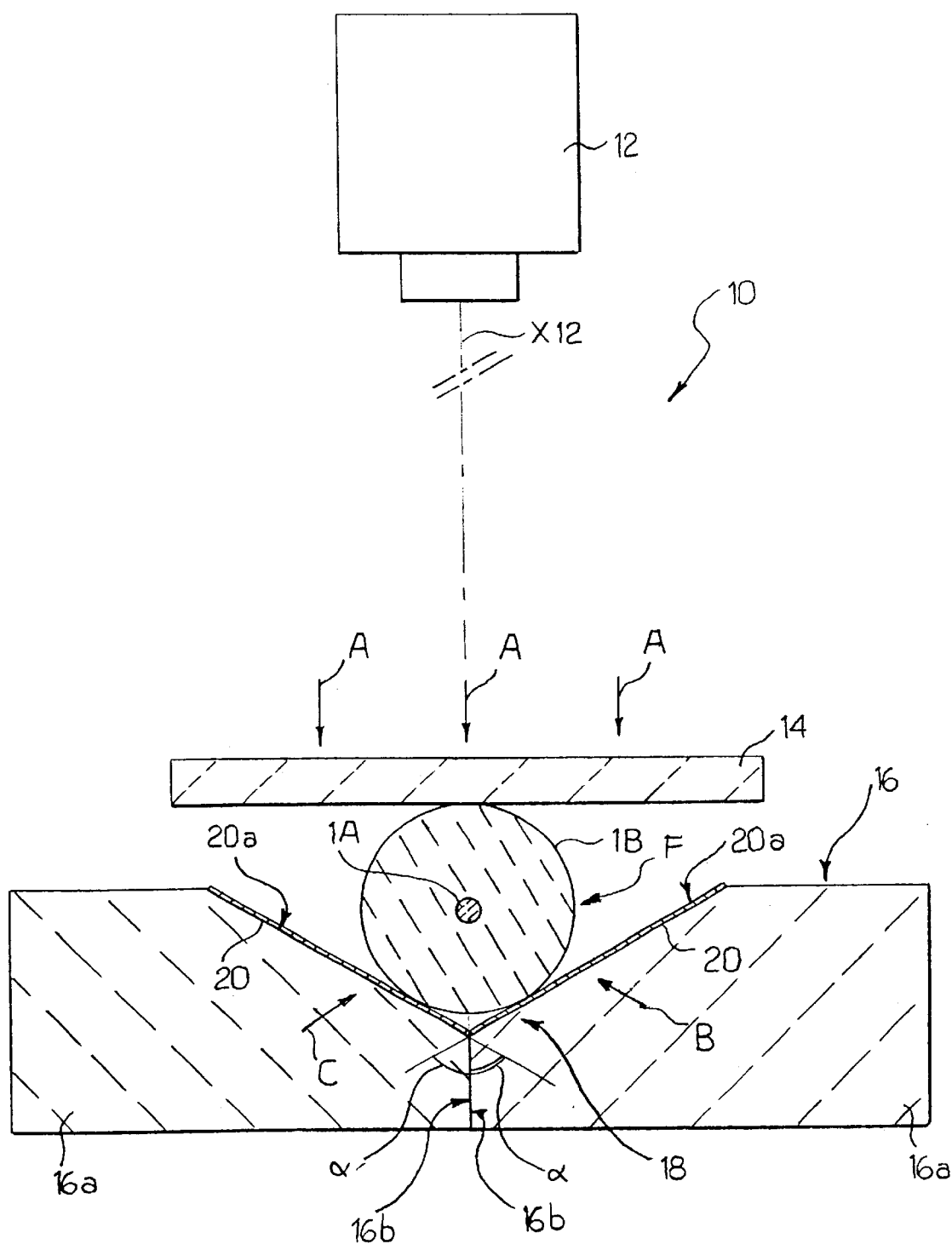
Fig_2

PROCESS AND DEVICE FOR MAKING GRATINGS IN OPTICAL FIBRES

FIELD OF THE INVENTION

The present invention relates to gratings made in optical fibres, and relates more specifically to gratings of the type called long-period gratings.

BACKGROUND OF THE INVENTION

Long period optical fiber gratings may have a period of a few tens of microns (typically 30–40 microns), which show a low temperature dependence. Devices of this type are known in the art, as demonstrated, for example, by the paper by J. B. Judkins et al., "Temperature-insensitive long-period fiber gratings," published on pages PD1-2 to PD1-5 of the Postdeadline Papers of the OFC Optical Fiber Communication '96 conference held on Feb. 29, 1996, or the paper by V. Bhatia et al., "Temperature-insensitive and strain-insensitive long-period grating sensors for smart structures," published in Opt. Eng. 36 (7), pp. 1872–1876 (July 1997).

These gratings, whose operation is primarily based on the coupling of a mode guided in the core of the fibre to modes which are propagated in the cladding, have become useful for applications in sensor technology and optical telecommunications, for example for use in band-rejection filters or gain equalizers for optical amplifiers. Unlike short-period gratings, long-period gratings do not backscatter the resonance wavelength.

For making these gratings, a corresponding length of optical fibre is subjected to the action of a radiation source, such as a frequency doubled argon laser, capable of causing a local variation of the refractive index in the core of the fibre. The profile (typically the period) of the variations of the refractive index induced in this way is determined by the characteristics of a writing mask interposed between the radiation source and the fibre. The mask, typically produced by photolithographic or similar methods, is made in such a way as to expose to the radiation, or mask from it, the successive areas of the fibre core in which the refractive index is to be changed or kept unaltered respectively.

In FIG. 1 of the attached drawings, the curve indicated by A represents the propagation characteristics (in terms of attenuation—vertical scale, measured in dB) of a long-period grating made according to the known art. The attenuation is shown here as a function of the wavelength ($\lambda$—horizontal axis, measured in nm) with reference to a non-polarized radiation. The diagram clearly demonstrates the band-rejection filter characteristics shown by the grating in the area lying essentially between 1510 and 1530 nm. The fact that the curve A reproduced here shows an attenuation value of approximately 2 dB even outside the aforesaid area is due solely to the experimental set-up used for plotting the diagram.

On the other hand, the graph of the curve B, relating to the same grating, represents the variation (again measured as a function of the wavelength $\lambda$) of the parameter known as PDL, an abbreviation of "polarization dependent loss". In gratings made according to the known art, it is usual to find markedly differentiated behaviour in the presence of two optical radiations having polarizations orthogonal to each other. The form of the curve B in FIG. 1 demonstrates, above all, that this difference in behaviour, which is hardly perceptible outside the area in which the grating performs its filtering action, becomes very considerable (showing especially a rather irregular variation as a function of the wavelength $\lambda$) within the area in which the grating carries out its function as a band-rejection filter.

Without wishing to adopt any specific theory in respect of this matter, the applicant has reasons for thinking that this behaviour (which is such that the grating acts to a certain extent as a polarizer) is intrinsically related to the fact that, during the operation of writing the grating, the refractive index of the fibre core loses its characteristic of an essentially scalar value and assumes the characteristics of a tensorial value.

SUMMARY OF THE INVENTION

The object of the present invention is to overcome the aforesaid drawback in such a way that it is possible to make long-period in-fibre gratings in which the aforesaid polarization dependence is virtually eliminated.

According to the present invention, this object is achieved by means of a process having the characteristics claimed in a specific way in the following claims. The invention also relates to a device which can be used for the application of this process.

BRIEF DESCRIPTION OF THE DRAWING

The invention will now be described, purely by way of example and without restriction, with reference to the attached drawings, in which:

FIG. 1 relating to the characteristics of the known art, has already been described above;

FIG. 2 shows schematically the structure of a device operating according to the invention; and FIG. 3 shows, in a way essentially corresponding to that of FIG. 1, the characteristics of a grating made according to the invention.

DETAILED DESCRIPTION OF THE DRAWING

In FIG. 2, the reference numeral 10 indicates as a whole a device which can be used to make a long-period grating in a length of optical fibre F comprising a core 1A surrounded by a cladding 1B.

The grating is produced in a known way by illuminating the core 1A with the radiation emitted by a source 12 (for example a frequency doubled argon laser) through a mask 14 which has a succession of areas which are opaque and transparent to the radiation emitted by the source 12.

Instead of simply resting on a support (e.g. a plate of silica located in a position diametrically opposite the mask 14), the fibre F, in the device 10 according to the invention is associated with a support 16 provided with a surface cut-out such as a V-shaped groove 18, to enable the operation of writing the grating to take place.

The groove 18, capable of containing at least part of the fibre F within it, is made with a symmetrical V-shape forming an ideal dihedral whose opening angle is 120°.

As observed from the viewpoint of FIG. 2, each of the sides or flanks 20 of the groove 18 therefore lies in a plane inclined at an angle $\alpha$ of 60° to the direction of propagation of the radiation arriving from the source 12. In FIG. 2, this direction of propagation is indicated by X12.

The support 16 can be made, for example, from two plates 16a (of silica or quartz, for example), which are initially subjected to a chamfering operation so that each forms one of the planes 20 constituting the sides of the groove 18, and which then have their two rectilinear sides 16b, adjacent to the areas subjected to chamfering, placed next to each other.

Provided that the described geometry is retained, the procedures for forming the groove 18 can be completely different: in particular, the support 16 can consist of a single piece of material subjected to machining.

The material forming the support 16 can also be different from those indicated, subject to the retention of the requirement to provide good characteristics of dimensional stability, the possibility of shaping the sides 20 as plane surfaces and (especially because of the possible applications in combination with a source 12 of high power) the capacity of providing good characteristics of heat dissipation.

Preferably (and particularly when this does not result directly or virtually directly from the operation leading to the formation of the sides 20), a coating layer 20a, capable of showing a high degree of surface reflectivity combined with good characteristics of resistance to the radiation generated by the source 12, is formed on or applied to the support 16, at least on the sides 20 of the groove 18.

The radiation arriving from the source 12 (shown in FIG. 2 schematically and with its dimensions reduced to meet the evident requirements of illustration) is propagated in the direction indicated by the arrows A, passing through the mask 14 and then striking the fibre F and in particular the core 1A. However, the characteristics of high reflectivity of the sides 20 of the groove 18 have the effect of causing the radiation arriving from the source 12 (and in particular the fraction of it which is propagated in a grazing direction with respect to the fibre F) to strike the sides 20 of the groove 18 and then to be reflected towards the fibre F in the directions of propagation indicated by the arrows B and C in FIG. 2.

In the parts corresponding to the transparent areas of the mask 14, the fibre F, and in particular its core 1A, is thus struck by three radiation fronts which are propagated towards the core 1A in three different directions, separated from each other by angles of 120°.

Because of the high degree of reflectivity imparted to the sides 20 of the groove 18, the three radiation fronts generated in this way (the first one directly by the source 12, acting as a first generator, the other two by the sides 20 of the groove 18 provided in support 16, these sides acting as further generator means by way of reflection) have levels of intensity which are essentially identical to each other.

Experiments conducted by the applicant demonstrate that this procedure, and in particular the fact of making the grating by irradiating the fibre F with a plurality of radiation fronts which strike the core 1A in a plurality of different angular directions (distributed in a uniform or essentially uniform way in space), is such that, although its value is varied by the effect of the irradiation, the refractive index of the core 1A of the fibre retains characteristics of essential uniformity over the whole section of the core 1A.

The result which can be achieved with the solution according to the invention is represented by the curves reproduced in FIG. 3 and identified by A and B respectively in a similar way to that used in FIG. 1. FIG. 3 shows the characteristics of propagation of an in-fibre grating essentially similar to that considered with reference to FIG. 1.

The results documented in FIG. 3 demonstrated that, for an equivalent behaviour as a band-rejection filter (curve A), the variation of the PDL (graph B), when compared with the corresponding graph in FIG. 1, is rather more regular, possibly because the maximum values of PDL measurable in the band rejection area are rather low, especially if compared with the variation of the same parameter outside this area.

Theoretically at least, it would be possible to consider increasing the number of radiation fronts striking the core 1A. This result can be obtained, for example, by using mechanisms for splitting the radiation arriving from the source 12 between different optical paths designed to be directed back towards the core 1A of the fibre F.

However, the solution shown in FIG. 2 is to be considered preferable, at the present time at least, since it enables excellent results to be obtained with a simple device. All of this is done with the further advantage due to the fact that the two radiation fronts indicated by the arrows B and C of FIG. 2 are obtained directly (by simple reflection) from the principal wave front represented by the arrows A after this front has passed through the mask 14.

The reflective sides 20 of the groove 18 can, if necessary, be subjected to machining and/or treatment designed to enable the sides 20 to provide a slight focusing action in respect of the radiation incident on them. However, the experiments conducted by the applicant demonstrate that this refinement is superfluous in most cases.

In the light of these considerations, therefore, it is clear that, provided that the principle of the invention is retained, the details of production and the forms of embodiment can be widely varied from those described and illustrated without departure from the scope of the present invention.

What is claimed is:

1. A process of making gratings in an optical fibre having core surrounded by cladding, the process comprising inducing local periodic variations in the refractive index of the said core by exposure to radiation having corresponding periodic intensity variations, wherein the said variations of the refractive index are induced by exposing the said core to a plurality of radiations which strike the core in respective different directions distributed angularly in an essentially uniform way, the plurality of radiations being obtained from a single radiation source, sending a first radiation of the plurality of radiations directly towards the fibre while sending the other radiations towards the fibre after being subjected to reflection, providing, for the generation of each of the said other radiations, a respective reflective surface capable of being struck by the said first radiation, redirecting the said first radiation towards the said core as a result of reflection, providing two of the said reflection surfaces, and forming jointly a receiving cut-out for the fibre in which the grating is made.

2. The process according to claim 1, wherein the said plurality of radiations comprises at least three radiations.

3. The process of claim 1 wherein the angular distribution is around the axis of the fiber.

4. A process of making gratings in an optical fibre having a core surrounded by cladding, the process comprising inducing local periodic variations in the refractive index of the said core by exposure to radiation having corresponding periodic intensity variations, wherein the said variations of the refractive index are induced by exposing the said core to a plurality of radiations which strike the core in respective different directions distributed angularly in an essentially uniform way, the plurality of radiations being obtained from a single radiation source, sending a first radiation of the plurality of radiations directly towards the fibre while sending the other radiations towards the fibre while sending the other radiations towards the fibre after being subjected to reflection, providing, for the generation of each of the said other radiations, a respective reflective surface capable of being struck by the said first radiation, redirecting the said first radiation towards the said core as a result of reflection, the said respective reflective, surface lying in a plane forming an angle ($\alpha$) of 60° to the direction of propagation of the said first radiation.

5. The process of claim 4, wherein the said grating is a long-period grating.

6. A device for making gratings in an optical fibre having a core surrounded by a cladding, the device comprising a generator for generating a radiation having local periodic variations of intensity capable of inducing corresponding periodic variations of the refractive index of the said core, the said generator being (a) associated with at least one further generator and (b) arranged to interact with the further generator to generate a plurality of radiations for striking the said ore in respective different directions distributed angularly in an essentially uniform way, the generator comprising:

(a) a radiation source for sending a first radiation of the said plurality towards the fibre, (b) a mask interposed in the path of propagation of the said first radiation from the said source towards the said fibre, for generating the said local periodic variations of intensity of the radiation, the said at least one further generator comprising:

(a) a support for the fibre, and (b) a reflector associated with the said support and capable of being struck by the radiation produced by the said source in such a way as to generate, by reflection, other radiations of the said plurality, directed towards the said core; the said reflector comprising reflective surfaces lying in respective planes forming an angle of 60° to the direction of propagation of the said first radiation.

7. The device according to claim 6, wherein the said support comprises two of the said reflective surfaces.

8. The device according to claim 7, wherein the said reflective surfaces jointly form a cut-out of the said support capable of receiving at least part of the said fibre.

9. The device according to claim 7 wherein the said support includes two plate elements, each provided with a respective one of th said reflective surfaces, with the said reflective surfaces placed adjacently to each other.

10. The device of claim 6 wherein the plurality of radiation includes at least three.

11. The device of claim 6 wherein the angular distribution is around the axis of the fiber.

12. A process of making gratings in an optical fibre having a core surrounded by cladding, the process comprising inducing local periodic variations of refractive index in the core by exposing the core to radiation having corresponding periodic intensity variations sufficient to form the refractive index, the variations of the refractive index being induced by exposing the core to radiation which strikes the core from different plural directions with substantially the same intensity, the radiation from the different plural directions emanating from a single radiation source, the radiation at one of said directions being incident directly on the fiber from the single source, without reflection, and radiation from the single source at the other directions being incident on the core after being reflected, the reflected radiation being reflected from two reflecting surfaces upon which the fiber abuts while the gratings are being formed.

13. The process of claim 12, wherein the plural directions is at least equal to three.

14. The process of claim 12 wherein the radiation from the different angles is reflected from the reflectors and is simultaneously incident on the core.

15. A process of making gratings in an optical fiber having a core surrounded by a cladding, the process comprising inducing local periodic variations of refractive index in the core by exposing the core to radiation having corresponding periodic intensity variations sufficient to form the refractive index, the variations of the refractive index being induced by exposing the core to radiation which strikes the core from different plural directions with substantially the same intensity, the radiation at one of said directions being incident directly on the fiber from a source, without reflection, and radiation at the other directions being incident on the core after being reflected.

16. The process of claim 15 wherein the grating is a long-period grating.

17. The process of claim 15 wherein the radiation from the different angles is simultaneously incident on the core.

18. The process of claim 15 wherein the different plural directions are around the axis of the fiber.

19. A process of making gratings in an optical fiber having a core surrounded by a cladding, the process comprising inducing local periodic variations of refractive index in the core by exposing the core to radiation having corresponding periodic intensity variations sufficient to form the refractive index, the variations of the refractive index being induced by exposing the core to radiation which strikes the core from different plural directions with substantially the same intensity, the radiation from the different plural directions emanating from a single radiation source, the radiation at one of said directions being incident directly on the fiber from the single source, without reflection, and radiation from the single source at the other directions being incident on the core after being reflected, the reflecting surfaces being planar and tilted at opposite directions displaced by 60 degrees from the direction of the radiation that is directly incident on the fiber.

* * * * *